United States Patent

Ota et al.

(10) Patent No.: US 9,759,820 B2
(45) Date of Patent: Sep. 12, 2017

(54) RADIATION POSITION DETECTOR, PET DEVICE, AND RECORDING MEDIUM

(71) Applicant: HAMAMATSU PHOTONICS K.K., Hamamatsu-shi, Shizuoka (JP)

(72) Inventors: Ryosuke Ota, Hamamatsu (JP); Ryoko Yamada, Hamamatsu (JP); Tomohide Omura, Hamamatsu (JP); Mitsuo Watanabe, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/333,350

(22) Filed: Oct. 25, 2016

(65) Prior Publication Data

US 2017/0123078 A1 May 4, 2017

(30) Foreign Application Priority Data

Oct. 28, 2015 (JP) .................... 2015-211891

(51) Int. Cl.
G01T 1/164 (2006.01)
G01T 1/20 (2006.01)
G01T 1/29 (2006.01)

(52) U.S. Cl.
CPC .......... G01T 1/2006 (2013.01); G01T 1/2985 (2013.01)

(58) Field of Classification Search
CPC ......... G01T 1/2985; G01T 1/172; G01T 1/20; G01T 1/2018
See application file for complete search history.

(56) References Cited

U.S. PATENT DOCUMENTS

| 5,783,829 A * | 7/1998 | Sealock .................... G01T 1/20 250/367 |
| 5,793,045 A * | 8/1998 | DiFilippo ............. G01T 1/2985 250/363.03 |
| 6,628,983 B1 * | 9/2003 | Gagnon ................ G01T 1/1648 600/431 |
| 2004/0124361 A1 | 7/2004 | Yamakawa |
| 2005/0253073 A1 | 11/2005 | Joram et al. |
| 2008/0128631 A1 * | 6/2008 | Suhami ..................... G01T 5/02 250/370.09 |

(Continued)

FOREIGN PATENT DOCUMENTS

JP  H07-49386 A  2/1995
JP  2008-190967  8/2008

*Primary Examiner* — Kiho Kim
(74) *Attorney, Agent, or Firm* — Drinker Biddle & Reath LLP

(57) ABSTRACT

A scintillator array including a plurality of scintillators, an optical detector array corresponding to the scintillators, an AD conversion unit configured to convert an analog signal output from each optical detector into digital data, and a position detection processing unit configured to specify a position of the scintillator on which the radiation is incident are provided. If there are two different pieces of digital data at the same time, the position detection processing unit determines that radiation is incident on two scintillators when energy value data of the two pieces of digital data is greater than an energy value of a Compton edge and specifies the address of the scintillator on which the radiation is incident by comparing the energy values of the two pieces of digital data when at least one of the two energy values is less than the energy value of the Compton edge.

9 Claims, 14 Drawing Sheets

(56) References Cited

U.S. PATENT DOCUMENTS

| | | | | |
|---|---|---|---|---|
| 2010/0006769 A1* | 1/2010 | Kraft | ............... | G01T 1/2907 |
| | | | | 250/370.11 |
| 2010/0264320 A1* | 10/2010 | Takayama | ............ | G01T 1/2985 |
| | | | | 250/362 |
| 2011/0211675 A1* | 9/2011 | Ramsden | ............... | G01T 1/40 |
| | | | | 378/82 |
| 2012/0228484 A1* | 9/2012 | Burr | ............... | G01T 1/248 |
| | | | | 250/252.1 |
| 2015/0316665 A1* | 11/2015 | Ramsden | ............... | G01T 1/40 |
| | | | | 378/207 |

* cited by examiner

RADIATION POSITION DETECTOR, PET DEVICE, AND RECORDING MEDIUM

TECHNICAL FIELD

Aspects of the present invention relate to a radiation position detector, a PET device, and a recording medium.

BACKGROUND

Conventionally, a radiation position detector which detects a position at which radiation is incident for a scintillator array including a plurality of scintillators is known. In this radiation position detector, Compton scattering may occur in radiation incident on a scintillator. When the Compton scattering occurs, the radiation may be simultaneously incident on two or more scintillators in the scintillator array. In this case, it is possible to increase the resolution of the radiation position detector by detecting the scintillator on which the radiation is first incident. For example, a radiation position detector described in Japanese Unexamined Patent Publication No. 7-49386 includes a scintillator array on which radiation is incident and an optical detector which photoelectrically converts a light emission phenomenon occurring in each scintillator of a scintillator array into a photoelectrically converted signal. In this radiation position detector, the levels of photoelectrically converted signal groups corresponding to a plurality of scintillators are compared with a plurality of different threshold values. A scintillator on which the radiation is incident is determined on the basis of features of signal pattern groups corresponding to the compared photoelectrically converted signal groups.

SUMMARY

However, in the radiation position detector described in Japanese Unexamined Patent Publication No. 7-49386, a circuit scheme in which outputs of photoelectrically converted signals detected from adjacent scintillators are compared in a comparator and a position of the photoelectrically converted signal having a high output is acquired is adopted. Thus, because the incidence of the same energy cannot be identified, radiation cannot be distinguished if separate pieces of radiation are simultaneously incident. Also, although it is possible to cope with scattering in horizontal and vertical directions among arrays arrayed in the horizontal and vertical directions on a structure of a circuit, it is difficult to detect a position at which radiation is incident in the case of oblique scattering.

An object of an aspect of the present invention is to provide a radiation position detector which detects a position at which radiation is incident with higher precision.

According to a form of the present invention, there is provided a radiation position detector including: a scintillator array including a plurality of scintillators on which radiation is incident; an optical detector array including a plurality of optical detectors corresponding one-to-one to the scintillators of the scintillator array; an AD conversion unit configured to convert an analog signal output from each optical detector of the optical detector array into digital data; and a position detection processing unit configured to specify a position of the scintillator on which the radiation is incident on the basis of the digital data obtained through the conversion by the AD conversion unit, wherein the digital data has at least time data corresponding to a time at which the radiation was incident, energy value data corresponding to a value of detected energy, and position data corresponding to an address of the scintillator in the scintillator array, and wherein the position detection processing unit includes: an energy comparison unit configured to compare, if there are two different pieces of digital data having time data indicating the same time, energy value data of the two pieces of digital data with an energy value of a Compton edge; and a position determination unit configured to determine that the radiation is incident on the scintillators corresponding to the position data of the two pieces of digital data when both energy values of the two pieces of digital data are greater than the energy value of the Compton edge and specify the address of the scintillator on which the radiation is incident by comparing the energy values of the two pieces of digital data when at least one of the energy values of the two pieces of digital data is less than the energy value of the Compton edge, on the basis of a comparison result of the energy comparison unit.

In the radiation position detector, the AD conversion unit converts a light emission phenomenon when radiation is incident on the scintillator into digital data. This digital data has an incident time of the radiation, an energy value, and an address. If there is digital data corresponding to two different scintillators at the same time of incidence, two questions of whether pieces of radiation are simultaneously incident and whether radiation has been subjected to Compton scattering after being incident on the scintillator are considered. If the radiation has been subjected to the Compton scattering, an energy value of at least one of two pieces of digital data is lower than energy of a Compton edge. Thereby, if two energy values included in the digital data are greater than the energy of the Compton edge, it is possible to determine that the separate pieces of radiation are simultaneously incident. In this case, two addresses of the two pieces of digital data can be designated as positions of incidence. On the other hand, if the energy value of one piece of the digital data is less than the energy of the Compton edge, it is possible to determine that Compton scattering has occurred. In this case, it is possible to compare energy values of the two pieces of digital data with each other and specify the address of the scintillator on which the radiation is incident. Therefore, it is possible to detect the position at which the radiation is incident with higher precision even when separate pieces of radiation are simultaneously incident and even when the Compton scattering has been caused.

Also, the position detection processing unit may be a configuration including a window comparison unit configured to compare the energy value data of the digital data with a window having a predetermined energy width if there is only one piece of the digital data having the time data indicating the same time and specify the address of the scintillator on which the radiation is incident on the basis of the position data of the digital data when the energy value data is within a range of the window. According to this configuration, when the energy value of the digital data is not within a window range, the digital data is treated as ineffective data and therefore noise or the like can be reduced.

Also, the plurality of scintillators may be configured to be arranged in a matrix shape in the scintillator array, and the energy comparison unit may be configured to perform comparison when two scintillators are vertically, horizontally, or obliquely adjacent to each other or further vertically, horizontally, or obliquely separated at a distance of one scintillator from positions adjacent to each other. Also, the plurality of scintillators may be configured to be arranged in a matrix shape in the scintillator array, and the energy comparison unit may be configured to perform comparison when the scintillators corresponding to the two pieces of digital data are vertically, horizontally, or obliquely adjacent to each other. According to these configurations, it is possible to compare energy values between the scintillators arranged in an oblique direction as well as between the scintillators arranged in a vertical or horizontal direction. Also, positions of the two scintillators are separated and the light emission phenomenon by the Compton scattering is exponentially reduced. Thus, it is possible to perform efficient position detection by limiting a target to be compared by the energy comparison unit.

Also, when only one of the two pieces of digital data has the energy value data greater than or equal to the energy value of the Compton edge, the position determination unit may be configured to determine that the radiation is incident on the scintillator of the address of the other digital data. When both of the two pieces of digital data have the energy value data less than the energy value of the Compton edge, the position determination unit may be configured to determine that the radiation is incident on the scintillator of the address of the digital data having a high energy value. It is possible to perform position detection with higher precision than, for example, when an address of a low energy value is determined to be a position of incidence by making a determination on the basis of a reaction mechanism of the light emission phenomenon due to Compton scattering.

Also, a pair of optical detector arrays may be configured to be provided in front of and behind the scintillator array. The position detection processing unit may be configured to further include an angle determination unit configured to obtain depths of interaction positions of the radiation in the two scintillators by DOI detection and obtain an angle in-between two points of the interaction positions with respect to a direction perpendicular to an extending direction of the scintillator. When only one of the two scintillators has the energy value data greater than or equal to the energy value of the Compton edge, the position determination unit may be configured to determine that the radiation is incident on the scintillator of the address of the other digital data. When both of the energy values of the two scintillators are less than the energy value of the Compton edge, the position determination unit may be configured to determine the scintillator on which the radiation is incident on the basis of an energy value difference between the two scintillators and the angle in-between the two points. In particular, the position determination unit may be configured to determine that the radiation is incident on the scintillator corresponding to the position data of the digital data having high energy value data when the angle in-between the two points obtained by the angle determination unit is greater than 30 degrees if both of the energy values of the two pieces of digital data are less than energy of the Compton edge, and the position determination unit may be configured to determine that the radiation is incident on the scintillator corresponding to one piece of the digital data on the basis of a difference between energy value data in the two scintillators and the angle in-between the two points when the angle in-between the two points obtained by the angle determination unit is less than 30 degrees. According to this configuration, it is possible to more correctly determine whether Compton scattering is one of forward scattering and backward scattering by obtaining an angle between two points of interaction positions on the basis of DOI detection. Thereby, it is possible to perform position detection with higher precision.

According to a form of the present invention, there is provided a non-transitory computer-readable recording medium recording a program for causing a computer to execute a process of specifying a position of a scintillator on which radiation is incident on the basis of digital data obtained through conversion by an AD conversion unit and having at least time data corresponding to a time at which the radiation is incident, energy value data corresponding to a value of detected energy, and position data corresponding to an address of the scintillator in a scintillator array in a radiation position detector including the scintillator array including a plurality of scintillators on which the radiation is incident, an optical detector array including a plurality of optical detectors corresponding one-to-one to the scintillators of the scintillator array, and the AD conversion unit configured to convert an analog signal output from each optical detector of the optical detector array into the digital data, the process including: an energy comparison step of comparing, if there are two different pieces of digital data having time data indicating the same time, energy value data of the two pieces of digital data with an energy value of a Compton edge; and a position determination step of specifying the position of the scintillator on which the radiation is incident from the position data of the digital data on the basis of a comparison result of the energy comparison step.

According to the radiation position detector according to the form of the present invention, it is possible to detect a position at which radiation is incident with higher precision.

DETAILED DESCRIPTION

Hereinafter, embodiments of the present invention will be specifically described with reference to the drawings. For convenience, elements that are substantially the same are denoted by the same reference signs and description thereof may be omitted.

[First Embodiment]

Figure 1B:
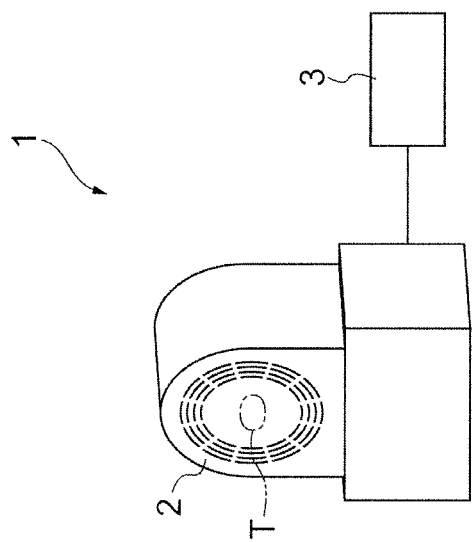
FIG. 1B is a cross-sectional view of a gantry in the PET device.
Figure 1A:
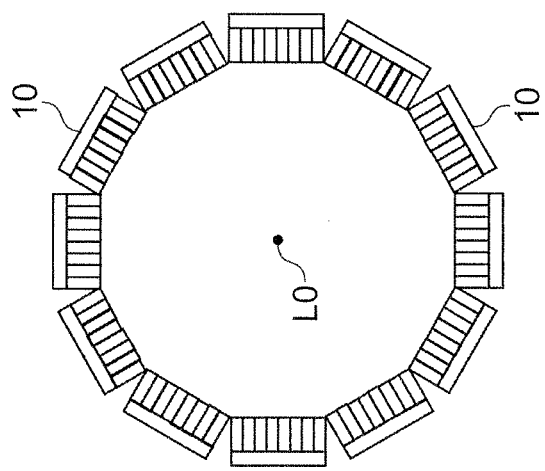
FIG. 1A is a schematic diagram of a PET device according to an embodiment.

FIG. 1A is a schematic diagram of a positron emission tomography (PET) device of the embodiment. FIG. 1B is a cross-sectional view of a gantry of the PET device. As illustrated in FIGS. 1A and 1B, the PET device 1 includes a bed (not illustrated) on which a subject T is placed, a gantry 2 having a cross-sectional circular opening, and an image processing unit 3 to which data detected in the gantry 2 is transmitted. Also, for the gantry 2 of the PET device 1, a plurality of radiation position detectors 10 are arrayed in a ring shape in contact with one another on a circumference having a predetermined line L0 as a center line. The PET device 1 is a device which detects γ rays emitted from the subject T to which a drug labeled with positron radiator species (radioisotopes which emit positrons) is administrated to acquire tomogram images of the subject T at a plurality of slice positions.

Figure 2:
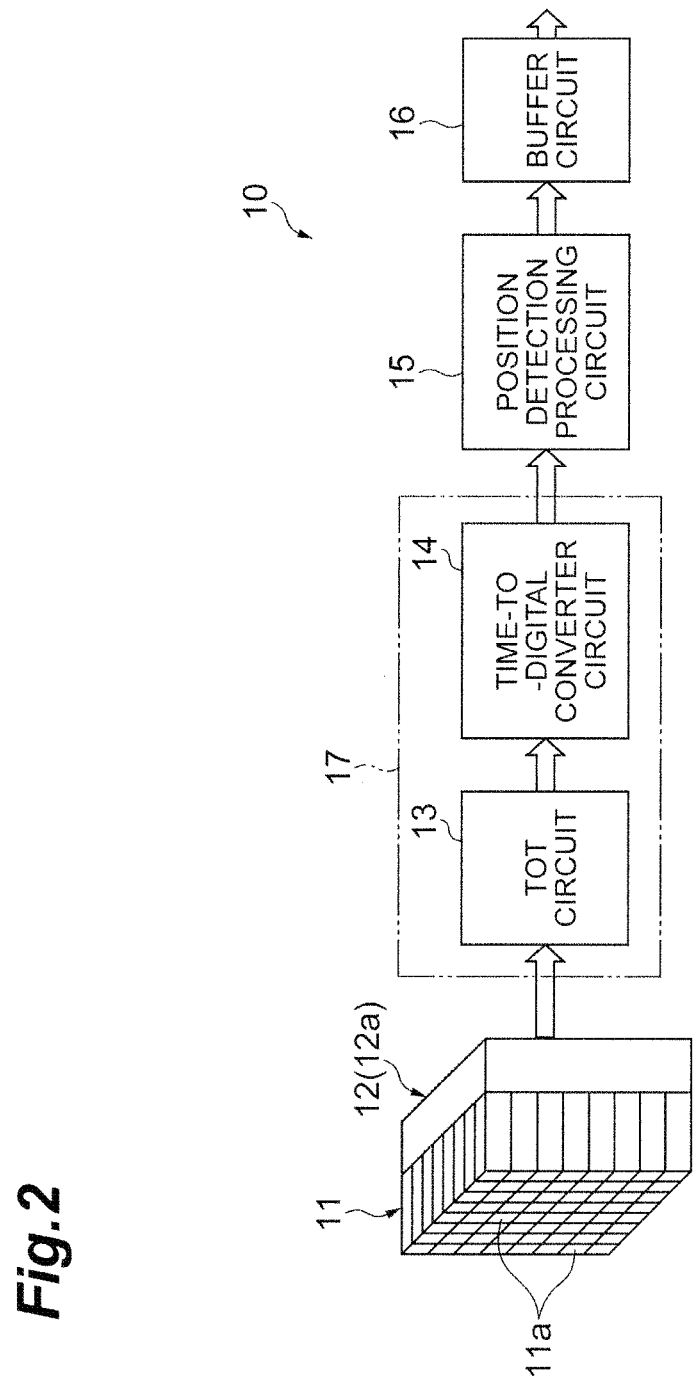
FIG. 2 is a configuration diagram of a radiation position detector according to an embodiment.

FIG. 2 is a configuration diagram of a radiation position detector. As illustrated in FIG. 2, the radiation position detector 10 includes a scintillator array 11, an optical detector array 12, a time over threshold (ToT) circuit 13, a time-to-digital converter circuit 14, a position detection processing circuit 15, and a buffer circuit 16. The radiation position detector 10 in the present embodiment detects positions of γ rays emitted from the subject T. The position detection processing circuit 15 and the buffer circuit 16 are, for example, computers including a CPU in which a calculation process is performed, a storage device constituted of memories such as a RAM and a ROM, an input/output device, etc. Also, the position detection processing circuit 15 and the buffer circuit 16 may be constituted of a field-programmable gate array (FPGA) circuit.

The scintillator array 11 includes a plurality of scintillators 11a on which radiation is incident. The plurality of scintillators 11a are arranged in a matrix shape in the scintillator array 11. In the illustrated example, (8×8) scintillators 11a are aligned in a horizontal direction and a vertical direction. The optical detector array 12 is provided on an output plane of the scintillator array 11.

The optical detector array 12 includes a plurality of optical detectors 12a. The plurality of optical detectors 12a correspond one-to-one to the scintillators 11a of the scintillator array 11. In the illustrated example, (8×8) optical detectors 12a are aligned in a horizontal direction and a vertical direction and arranged in a matrix shape. The optical detector 12a outputs an electric signal amplified according to the strength of emitted light when a light emission phenomenon occurs in the scintillator 11a. The electric signal output from the optical detector 12a is input to the ToT circuit 13.

The ToT circuit 13 outputs a pulse signal of a time width according to a magnitude (a pulse height) of the input electric signal. That is, the ToT circuit 13 outputs a pulse signal of a time width according to the strength of emitted light in the scintillator 11a. The pulse signal output from the ToT circuit 13 is input to the time-to-digital converter circuit 14.

The time-to-digital converter circuit 14 converts the input pulse signal into digital data. The digital data has at least time data, energy value data, and position data. The time data corresponds to a time at which the radiation was incident. The time data may be, for example, a time at which the pulse signal was input to the time-to-digital converter circuit 14. The energy value data corresponds to energy of radiation input to the scintillator 11a. The energy value data is proportional to a time width of the pulse signal input to the time-to-digital converter circuit 14. The position data corresponds to an address of the scintillator 11a in the scintillator array 11. That is, it is possible to specify a position of the scintillator 11a in the scintillator array 11 according to the position data.

In the present embodiment, the ToT circuit 13 and the time-to-digital converter circuit 14 constitute the AD conversion unit 17 which converts an analog signal output from each optical detector 12a of the optical detector array 12 into digital data. That is, the AD conversion unit 17 converts the light emission phenomenon in the scintillator 11a when the radiation is incident into digital data having time data, energy value data, and position data. The digital data is input to the position detection processing circuit (position detection processing unit) 15.

Figure 3:
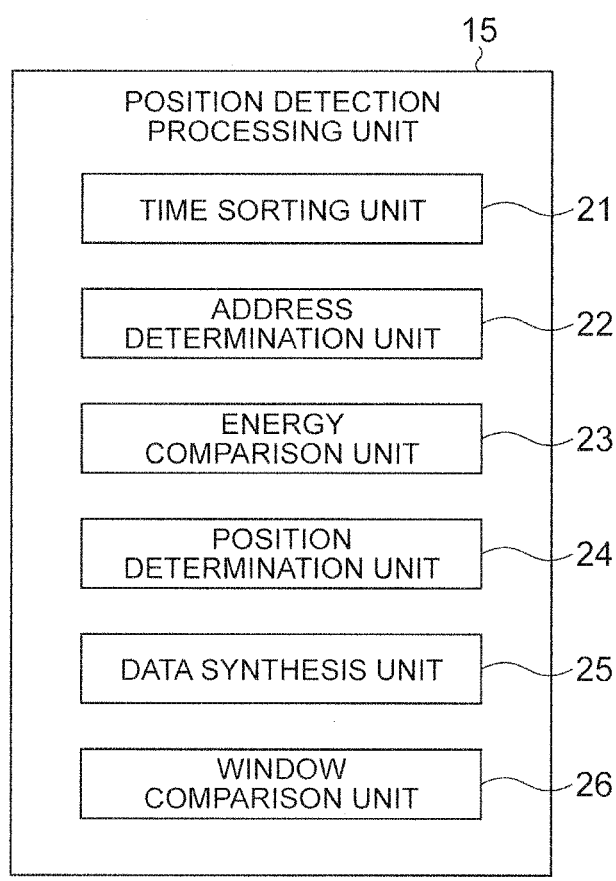
FIG. 3 is a functional block diagram illustrating a configuration of a position detection processing unit in the radiation position detector of FIG. 2.

The position detection processing circuit 15 specifies a position of the scintillator 11a on which the radiation is incident in the scintillator array 11 on the basis of the digital data obtained through the conversion by the AD conversion unit 17. FIG. 3 is a functional block diagram of the position detection processing circuit 15. The position detection processing circuit 15 includes, for example, a time sorting unit 21, an address determination unit 22, an energy comparison unit 23, a position determination unit 24, a data synthesis unit 25, and a window comparison unit 26, as illustrated in FIG. 3, as functional components.

The time sorting unit 21 sorts the digital data input from the AD conversion unit 17 according to time data. The digital data is input from the AD conversion unit 17 to the position detection processing circuit 15 every time the radiation is incident on the scintillator 11a. The time sorting unit 21 sorts digital data groups which are sets of input digital data on the basis of the time data and picks up digital data having the same time data.

The address determination unit 22 determines whether two scintillators 11a are isolated from each other or adjacent to each other within the scintillator array 11. This determination is, for example, executed according to whether addresses of the position data in the input digital data are adjacent to each other. The case in which the two scintillators 11a are adjacent to each other includes both the case in which one scintillator 11a and the other scintillator 11a are adjacent to each other in the horizontal direction or the vertical direction and the case in which one scintillator 11a and the other scintillator 11a are adjacent to each other in an oblique direction (a diagonal direction). Also, when the two scintillators 11a are not adjacent to each other in the present embodiment, the scintillators are represented as being isolated from each other. When the two scintillators 11a are isolated from each other, at least one other scintillator 11a is arranged in the horizontal direction, the vertical direction, or the oblique direction between the two scintillators 11a.

The energy comparison unit 23 compares energy value data in two input pieces of digital data with an energy value (a CEE value) of a Compton edge. In the present embodiment, for example, when the two pieces of digital data have the same time data and addresses thereof are adjacent to each other, the energy value data of the two pieces of digital data is compared with the CEE value.

Figure 4A:
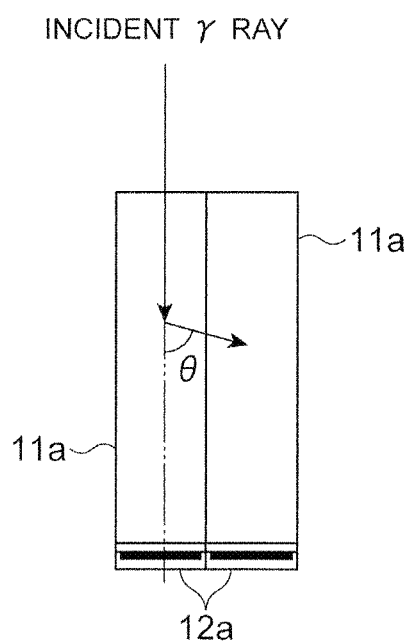
FIG. 4A is a diagram schematically illustrating forward scattering in Compton scattering.
Figure 4B:
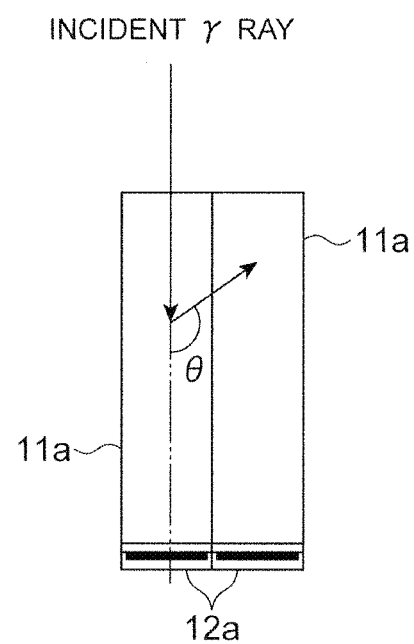
FIG. 4B is a diagram schematically illustrating backward scattering in the Compton scattering.

The position determination unit 24 specifies the address of the scintillator 11a on which the radiation is incident on the basis of a comparison result of the energy comparison unit 23. FIGS. 4A and 4B schematically illustrate a state in which the radiation incident on the scintillator 11a is subjected to Compton scattering. In FIGS. 4A and 4B, only two scintillators 11a adjacent to each other are drawn. FIGS. 4A and 4B illustrate states in which radiation incident on one scintillator 11a is scattered within an adjacent scintillator 11a due to Compton scattering. As illustrated in FIG. 4A, the case in which an angle formed by a direction in which radiation progresses due to scattering (a Compton scattering angle θ) with respect to a direction in which radiation first incident on the scintillator 11a progresses is less than 90 degrees is referred to as the forward scattering. Also, as illustrated in FIG. 4B, the case in which the Compton scattering angle θ is greater than or equal to 90 degrees is referred to as the backward scattering.

Figure 5:
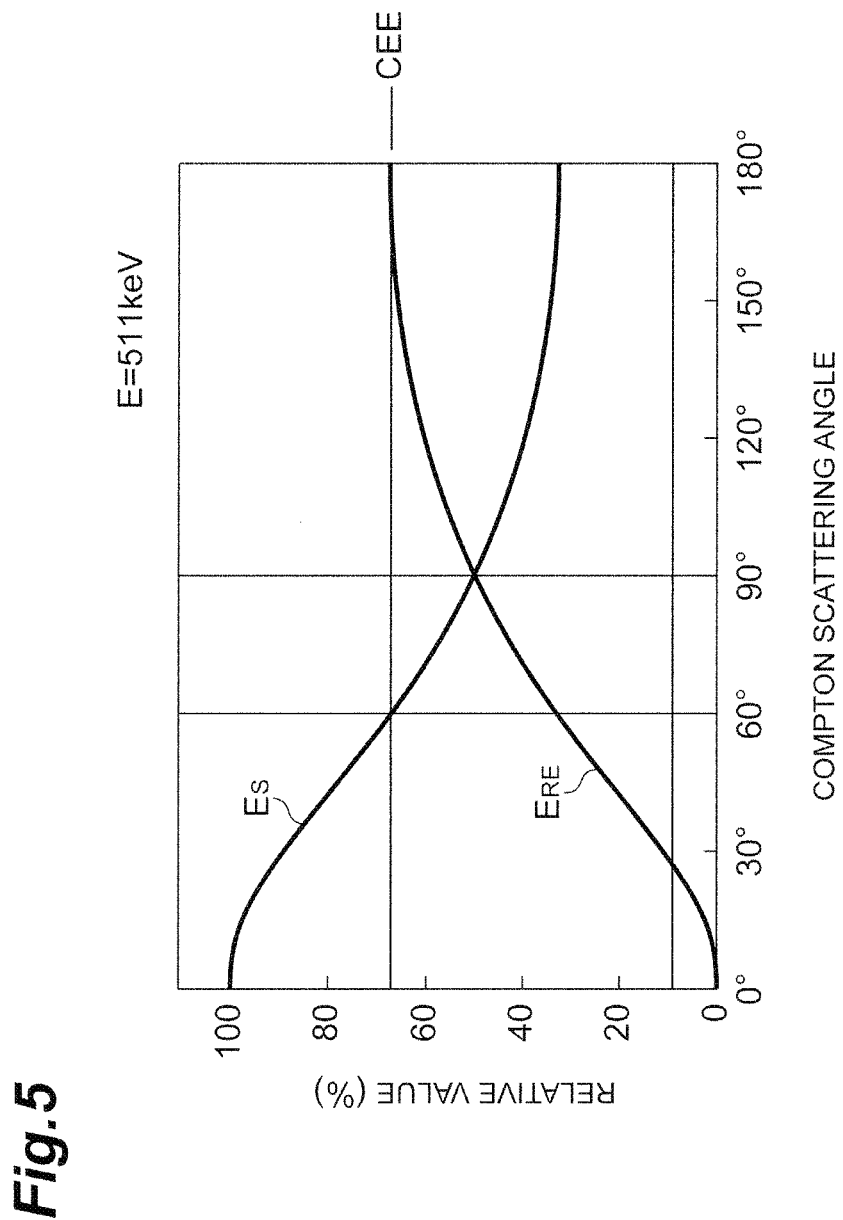
FIG. 5 is a diagram illustrating a relationship between a scattering angle in the Compton scattering and an energy value.

FIG. 5 is a diagram illustrating a relationship between the Compton scattering angle θ and the energy value. At the Compton scattering angle θ, scattered γ-ray energy $E_S$ and recoil electron energy $E_{RE}$ (energy at a scattering point) are obtained on the basis of an energy conservation law. In this case, at the Compton scattering angle θ, relative values of the scattered γ-ray energy $E_S$ and the recoil electron energy $E_{RE}$ (a maximum value of the scattered γ-ray energy $E_S$ is assumed to be 100%) are expressed as illustrated in FIG. 5 according to Equations (1) and (2) using the energy of γ rays as E (511 keV).

$$E_S = E/(2-\cos \theta) \quad (1)$$

$$E_{RE} = E(1-\cos \theta)/(2-\cos \theta) \quad (2)$$

As illustrated in FIG. 5, the scattered γ-ray energy $E_S$ has a maximum value (511 keV) when the Compton scattering angle is 0 degrees (when there is no Compton scattering) and the scattered γ-ray energy $E_S$ is lower when the Compton scattering angle is larger and has a minimum value (170 keV) when the Compton scattering angle is 180 degrees. On the other hand, the recoil electron energy $E_{RE}$ is minimized when the Compton scattering angle is 0 degrees and the recoil electron energy $E_{RE}$ is larger when the Compton scattering angle is larger and has a maximum value (341 keV) when the Compton scattering angle is 180 degrees. Because this maximum energy value (341 keV) is a CEE value, the recoil electron energy $E_{RE}$ is not greater than the CEE value. When the Compton scattering angle is less than 60 degrees, only the scattered γ-ray energy $E_S$ is greater than the CEE value. Thereby, when only one of two pieces of digital data is greater than or equal to the CEE value (when the Compton scattering angle is 0 to 60 degrees), the position determination unit 24 determines that radiation is incident on the scintillator 11a corresponding to position data of the other digital data. Also, if energy values of both of the two pieces of digital data are greater than the CEE value, it is determined that separate pieces of radiation are simultaneously incident on two scintillators 11a.

Also, in a range in which the Compton scattering angle is 60 degrees to 180 degrees, both the scattered γ-ray energy $E_S$ and the recoil electron energy $E_{RE}$ are less than the CEE value. When the Compton scattering angle is 90 degrees in such a range, the scattered γ-ray energy $E_S$ and the recoil electron energy $E_{RE}$ are inverted. Thus, it cannot be discriminated whether the Compton scattering angle is the forward scattering (60 to 90 degrees) or the backward scattering (90 to 180 degrees) using only the comparison of magnitudes of two detected energy values. However, a ratio of the backward scattering tends to be high in the range in which the Compton scattering angle is 60 degrees to 180 degrees. Therefore, the position determination unit 24 prioritizes sensitivity and determines the scattering in the range in which the Compton scattering angle is 60 degrees to 180 degrees as the backward scattering. That is, when energy value data of both of the two input pieces of digital data is less than the CEE value, the position determination unit 24 determines that γ rays are incident on the scintillator 11a corresponding to the position data having high energy value data. In the position determination unit 24, position data for which radiation is determined to be incident between two pieces of position data is managed as effective data.

The data synthesis unit 25 adds energy value data in the two input pieces of digital data. If the Compton scattering is observed in an adjacent scintillator 11a, the energy value data of one of the two input pieces of digital data is the scattered γ-ray energy $E_S$ and the other is the recoil electron energy $E_{RE}$. Thus, if the two energy values are added, 511 keV which is the energy of γ rays is theoretically given.

The window comparison unit 26 compares the energy value data in the input digital data with a window having a predetermined energy width. A range of the window includes an energy value (511 keV) of γ rays and is, for example, 450 to 600 keV. The window comparison unit 26 determines that the input digital data is valid when the input energy value data is within the window. The digital data determined to be valid is output to the buffer circuit 16. On the other hand, when the energy value is outside the window, the input digital data is determined to be invalid. The digital data determined to be invalid may be, for example, saved as noise data.

The digital data determined to be valid by the window comparison unit 26 is transferred to the buffer circuit 16. The buffer circuit 16 can temporarily save a transferred digital data group. The digital data group transferred to the buffer circuit 16 is transferred to the image processing unit 3.

Figure 6:
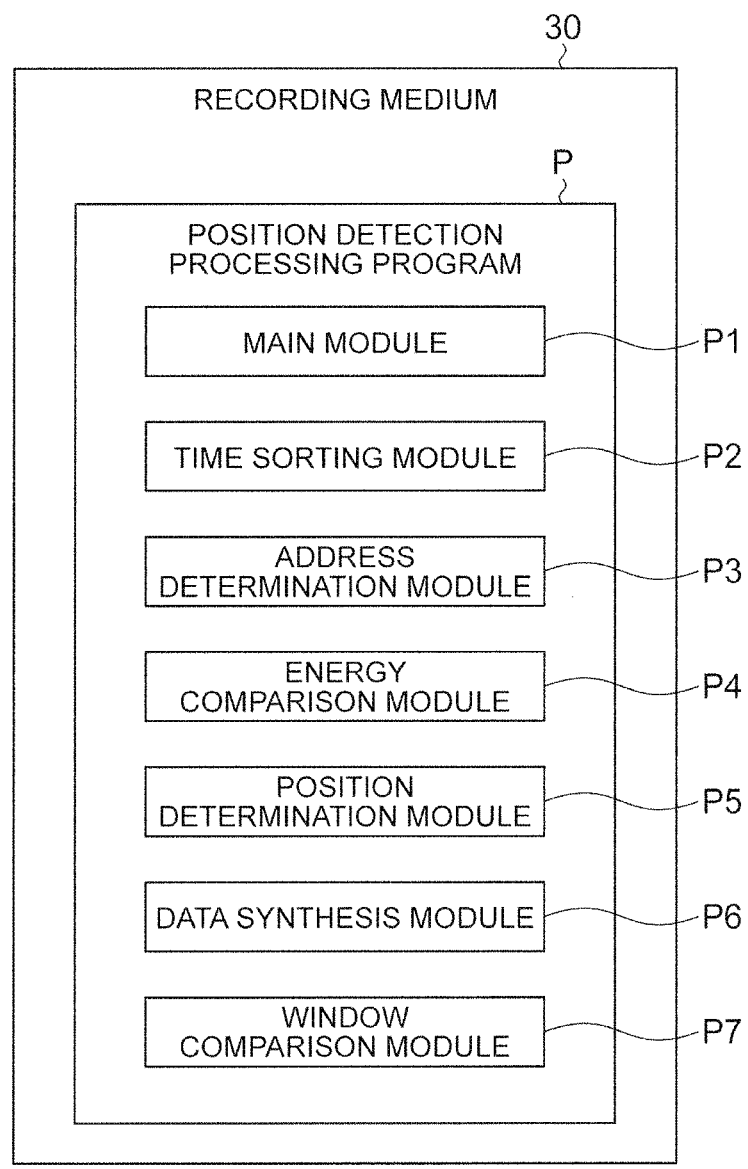
FIG. 6 is a diagram illustrating an embodiment of a recording medium recording a program for causing a computer to function as the position detection processing unit of FIG. 3.

FIG. 6 is a diagram illustrating an embodiment of a recording medium recording a position detection processing program for causing a computer to function as the position detection processing circuit 15. The recording medium 30 is constituted of, for example, a recording medium or a semiconductor memory such as a CD-ROM, a DVD, or a ROM. As illustrated in FIG. 3, a position detection processing program P is recorded in a program recording area in the recording medium 30. The position detection processing program P includes a main module P1, a time sorting module P2, an address determination module P3, an energy comparison module P4, a position determination module P5, a data synthesis module P6, and a window comparison module P7.

The main module P1 is a part which generally controls the position detection process. Functions implemented by executing the time sorting module P2, the address determination module P3, the energy comparison module P4, the position determination module P5, the data synthesis module P6, and the window comparison module P7 are similar to those of the time sorting unit 21, the address determination unit 22, the energy comparison unit 23, the position determination unit 24, the data synthesis unit 25, and the window comparison unit 26. Also, the position detection processing program P may be provided via a communication network as a computer data signal superimposed on propagation waves.

Next, an example of the position detection process in the radiation position detector will be described.

Figure 7:
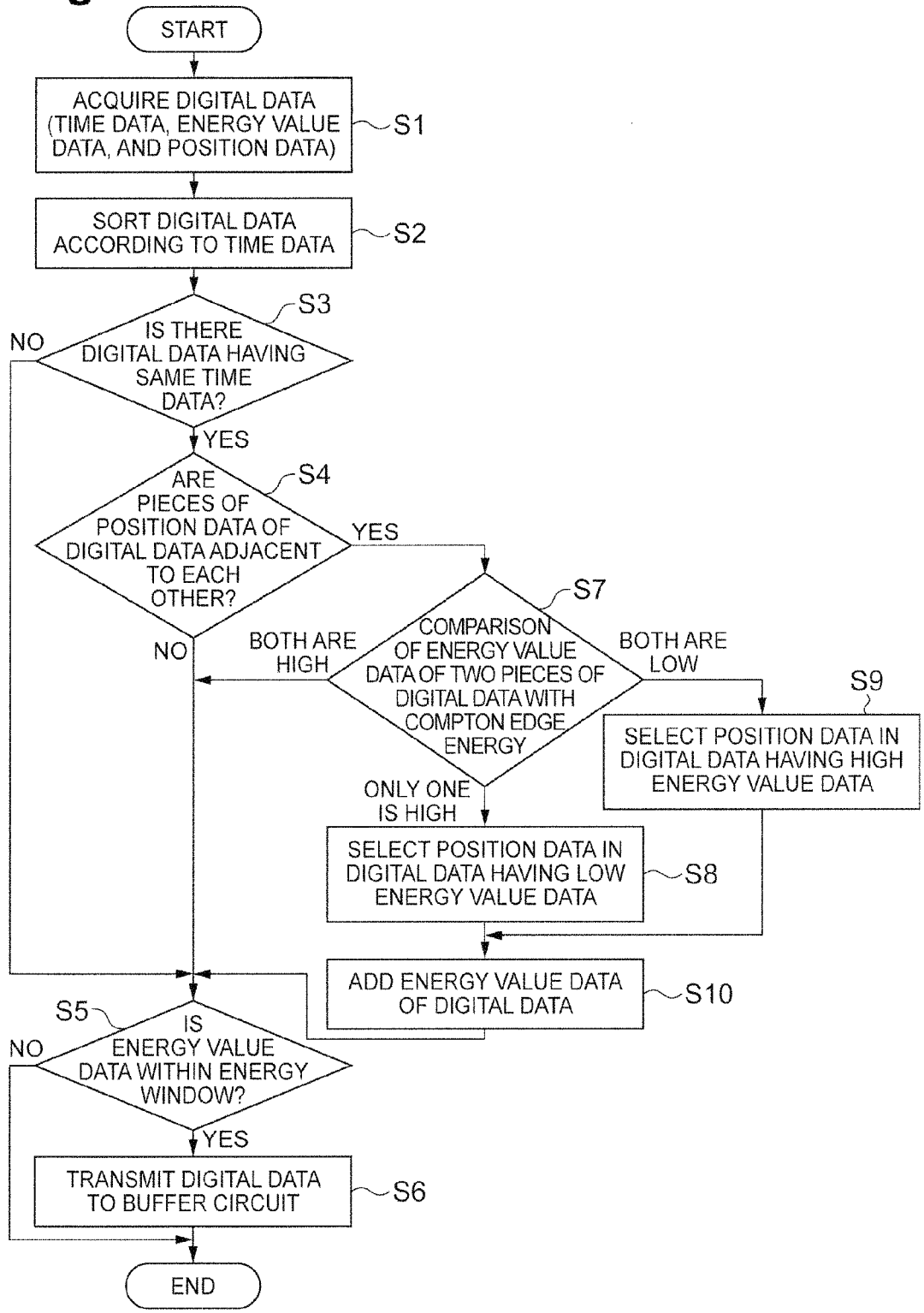
FIG. 7 is a flowchart illustrating a processing flow in the position detection processing unit of FIG. 3.

FIG. 7 is a flowchart illustrating the position detection processing flow in the position detection processing circuit 15. First, the position detection processing circuit 15 acquires digital data input from the AD conversion unit 17 (step S1). The digital data includes time data, energy value data, and position data. The digital data is input from the AD conversion unit 17 to the position detection processing circuit 15 every time the scintillator 11a and the optical detector 12a detect γ rays. Although the acquisition of the digital data can be executed by, for example, the time sorting unit 21, a separate digital data acquisition unit may be provided.

Next, the time sorting unit 21 sorts the acquired digital data on the basis of the time data (step S2). This process is performed on a digital data group constituted of a plurality of pieces of digital data.

Next, the time sorting unit 21 determines whether two different pieces of digital data having the same time data are in the sorted digital data group (step S3). If it is determined that the two different pieces of digital data having the same time data are absent, the incidence of the radiation on the scintillator 11a corresponding to the position data of the digital data is considered to be present. Therefore, the window comparison unit 26 determines whether the energy value data of the digital data is within the energy window (step S5). If it is determined that the energy value data is within the window, the digital data is treated as valid data. In this case, the digital data is transferred to the buffer circuit 16 (step S6).

On the other hand, if it is determined that the two different pieces of digital data having the same time data are present in step S3, the Compton scattering is likely to occur. Therefore, the address determination unit 22 determines whether position data of the two pieces of digital data is in an adjacency relation (step S4). As a result, if it is determined that two pieces of position data are not adjacent to each other, separate pieces of radiation are treated as being simultaneously incident on the two scintillators 11a. Therefore, the window comparison unit 26 determines whether the each energy value data of the two pieces of digital data is within the energy window (step S5). When it is determined that the each energy value data of the two pieces of digital data is within the energy window, the digital data is transferred to the buffer circuit 16 (step S6). On the other hand, when it is determined that the energy value data is outside the window, the digital data is saved or discarded as noise data.

If the result of step S4 indicates that the two pieces of position data are determined to be adjacent to each other, a possibility of occurrence of Compton scattering is considered to be high. Therefore, in this case, the energy comparison unit 23 compares values of energy value data in the two pieces of digital data with the CEE value (step S7).

If it is determined that two values of the energy value data are greater than the CEE value in step S7, the occurrence of the Compton scattering is absent and separate pieces of radiation are treated as being simultaneously incident on the two scintillators 11a. Therefore, the window comparison unit 26 determines whether the each energy value data of the two pieces of digital data is within the window (step S5). If it is determined that the energy value data is within the window, the digital data is transferred to the buffer circuit 16 (step S6).

If it is determined that only a value of one piece of the energy value data is greater than the CEE value in step S7, the forward scattering is treated as having occurred. In this case, the position data in the digital data having low energy value data is selected as an address of the scintillator 11a on which radiation is first incident (step S8).

When it is determined that two pieces of energy value data are less than the CEE value in step S7, the backward scattering is treated as having been caused. In this case, the position data in the digital data having high energy value data is selected as an address of the scintillator 11a on which radiation is first incident (step S9).

After steps S8 and S9, the data synthesis unit 25 adds values of energy value data of two pieces of digital data (step S10). The window comparison unit 26 determines whether the added energy value data is within the energy window (step S5). If it is determined that the energy value data is within the window, the digital data is transferred to the buffer circuit 16 (step S6). The digital data transferred to the buffer circuit 16 includes position data selected in step S8 or S9, the energy value data added in step S10, and time data.

In the above-described radiation position detector, the AD conversion unit 17 converts a light emission phenomenon when radiation is incident on the scintillator 11a into digital data. This digital data has incidence time data, energy value data, and position data. If there are two pieces of digital data having the same time data, two questions of whether separate pieces of radiation are simultaneously incident on the two scintillators 11a and whether radiation has been subjected to Compton scattering after being incident on the scintillator 11a are considered. If the radiation has been subjected to the Compton scattering, an energy value of at least one of two pieces of digital data is lower than energy of a Compton edge. Thereby, if two energy values included in the digital data are greater than the energy of the Compton edge, it is possible to determine that the separate pieces of radiation are simultaneously incident. In this case, two addresses of the position data of the two pieces of digital data can be designated as positions of incidence. On the other hand, if the energy value data of one piece of the digital data is less than the energy of the Compton edge, it is possible to determine that Compton scattering has occurred. In this case, it is possible to compare the energy value data of the two pieces of digital data with each other and specify a position of the scintillator 11a on which the radiation is incident. Therefore, it is possible to detect the position at which the radiation is incident with higher precision even when separate pieces of radiation are simultaneously incident and even when the Compton scattering has been caused.

Also, the position detection processing circuit 15 specifies the position of the scintillator 11a on which the radiation is incident on the basis of the position data of the digital data when the energy value data is within the range of the window. According to this configuration, because data is treated as invalid data when the energy value data of the digital data is not within the window, it is possible to reduce noise or the like.

Also, the energy comparison unit 23 compares two pieces of digital data determined to be adjacent to each other by the address determination unit 22. That is, one scintillator 11a can be compared with eight scintillators 11a surrounding the scintillator 11a. Thereby, the improvement of the resolution is expected. Also, positions of the two scintillators 11a are separated and the light emission phenomenon due to the Compton scattering is exponentially reduced. Thus, it is possible to perform efficient position detection by limiting a target to be compared by the energy comparison unit 23.

Also, when only one of the two pieces of digital data has the energy value data greater than or equal to the CEE value, the position determination unit 24 may be configured to determine that the radiation is incident on the scintillator 11a of the address of the other digital data. When both of the two pieces of digital data are less than the CEE value, the position determination unit 24 determines that the radiation is incident on the scintillator 11a of the address of the digital data having a high energy value. Thus, it is possible to perform position detection with high precision by making a determination on the basis of a reaction mechanism of the light emission phenomenon due to Compton scattering.

[Second Embodiment]

A radiation position detector 100 in the present embodiment is different from the radiation position detector 10 of the first embodiment in that an angle between two points of interaction positions of the radiation in adjacent scintillators is used in the determination of a detection position. Hereinafter, differences of the radiation position detector 100 in the present embodiment from the first embodiment will be mainly described, the same elements or members are denoted by the same reference signs, and detailed description thereof will be omitted.

Figure 8:
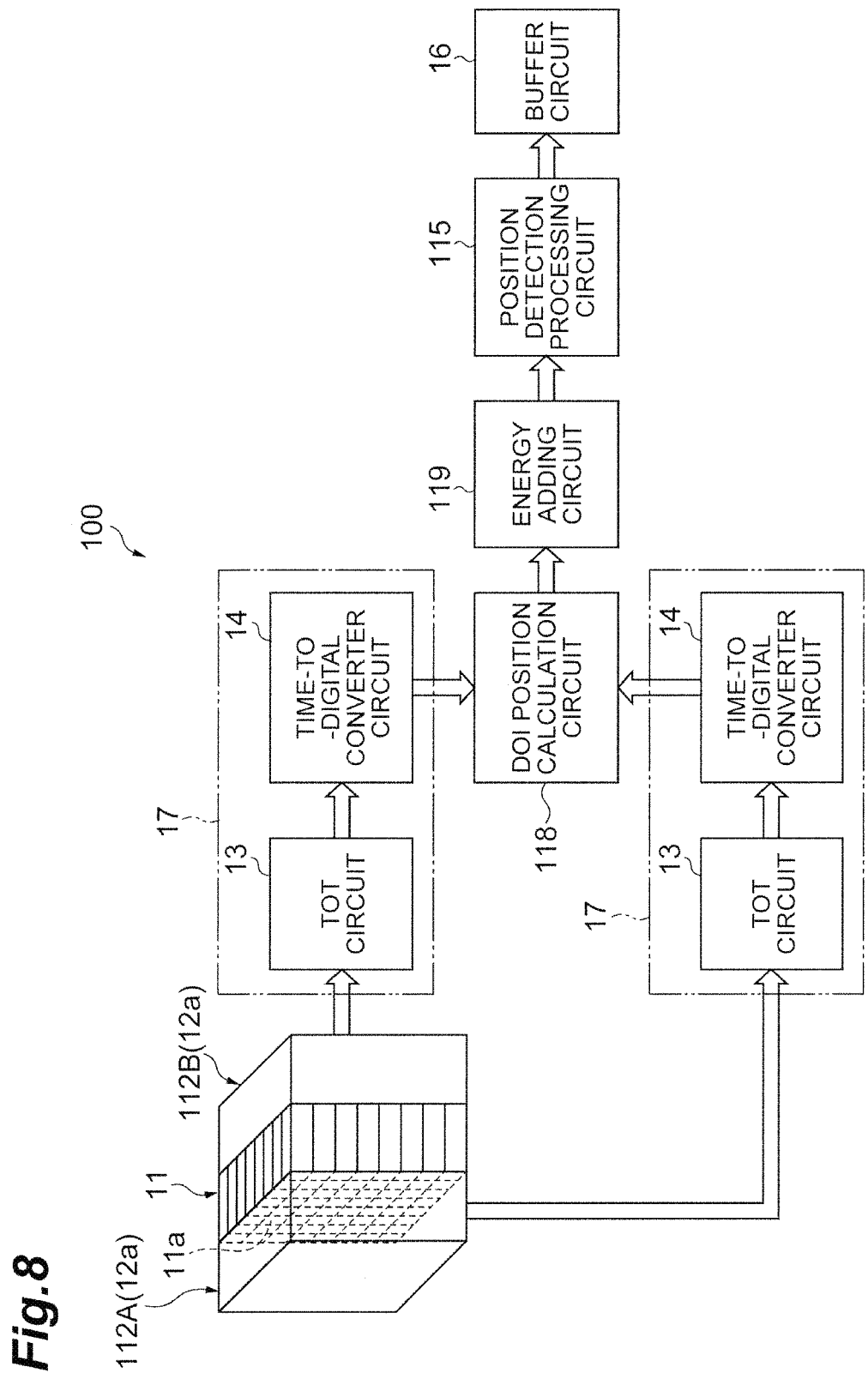
FIG. 8 is a configuration diagram of a radiation position detector according to another embodiment.

FIG. 8 is a block diagram illustrating a configuration of the radiation position detector. As illustrated in FIG. 8, the radiation position detector 100 includes a scintillator array 11, a first optical detector array 112A, a second optical detector array 112B, a ToT circuit 13, a time-to-digital converter circuit 14, a depth of interface (DOI) position calculation circuit 118, an energy adding circuit 119, a position detection processing circuit 115, and a buffer circuit 16. The position detection processing circuit 115 and the buffer circuit 16 are, for example, computers including a CPU in which a calculation process is performed, a storage device constituted of memories such as a RAM and a ROM, an input/output device, etc. Also, the position detection processing circuit 115 and the buffer circuit 16 may be constituted of an FPGA circuit.

The first optical detector array 112A is provided on a front side of the scintillator array 11 (a radiation incidence side). Also, the second optical detector array 112B is provided on a rear side of the scintillator array 11. The first optical detector array 112A and the second optical detector array 112B have the same configuration as the optical detector array 12 and include a plurality of optical detectors 12a corresponding to all scintillators 11a. The ToT circuit 13 is connected to each of the first optical detector array 112A and the second optical detector array 112B. The time-to-digital converter circuit 14 is connected to each of the ToT circuits 13. The time-to-digital converter circuits 14 are connected to the DOI position calculation circuit 118. That is, digital data into which an electric signal output from the first optical detector array 112A is converted by AD conversion and digital data into which an electric signal output from the second optical detector array 112B is converted by AD conversion are input to the DOI position calculation circuit 118.

The DOI position calculation circuit 118 obtains a depth (a position of a front/rear direction within the scintillator) of a position (an interaction position) at which the light emission phenomenon occurs in the scintillator 11a as a DOI value. The DOI position is calculated according to an energy value detected by the first optical detector array 112A and an energy value detected by the second optical detector array 112B. In the DOI position calculation circuit 118, the calculated DOI position is added as DOI position data to digital data. Digital data from the first optical detector array 112A and digital data from the second optical detector array 112B has position data and time data of the same values. Therefore, the DOI position calculation circuit 118 integrates two input pieces of the position data and the time data into one piece. The position data and the time data are integrated and digital data to which the DOI position data is added is input to the energy adding circuit 119.

The energy adding circuit 119 adds the energy value data of the digital data from the first optical detector array 112A and the energy value data of the digital data from the second optical detector array 112B. Thereby, it is possible to acquire all energy value data in the scintillator 11a for which the DOI position is calculated. Digital data in which the energy value data is added (including time data, energy value data, position data, and DOI position data) is input to the position detection processing circuit 115.

Figure 9:
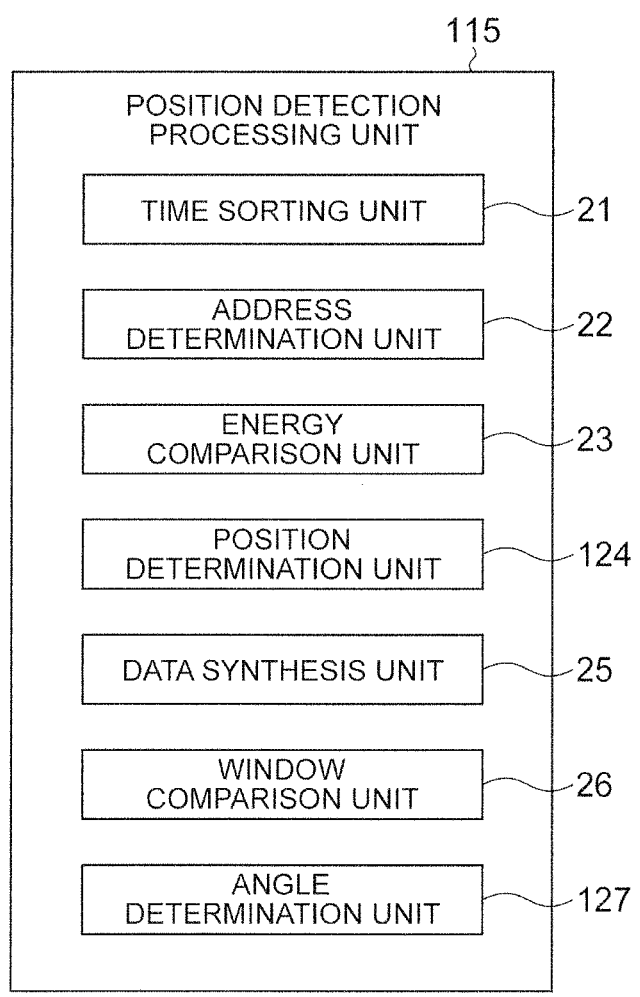
FIG. 9 is a functional block diagram illustrating a configuration of a position detection processing unit in the radiation position detector of FIG. 8.

The position detection processing circuit (a position detection processing unit) 115 specifies a position of the scintillator 11a on which the radiation is incident in the scintillator array 11 on the basis of the input digital data. FIG. 9 is a functional block diagram of the position detection processing circuit 115. The position detection processing circuit 115 includes, for example, a time sorting unit 21, an address determination unit 22, an energy comparison unit 23, a position determination unit 124, a data synthesis unit 25, a window comparison unit 26, and an angle determination unit 127 as illustrated in FIG. 9, as functional components.

Figure 10A:
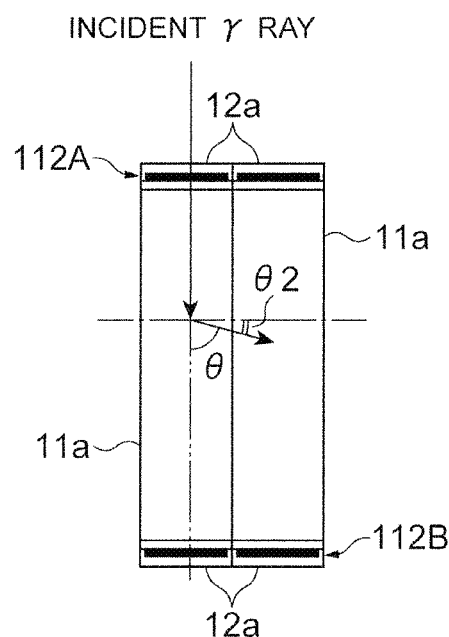
FIG. 10A is a diagram schematically illustrating forward scattering in Compton scattering.
Figure 10B:
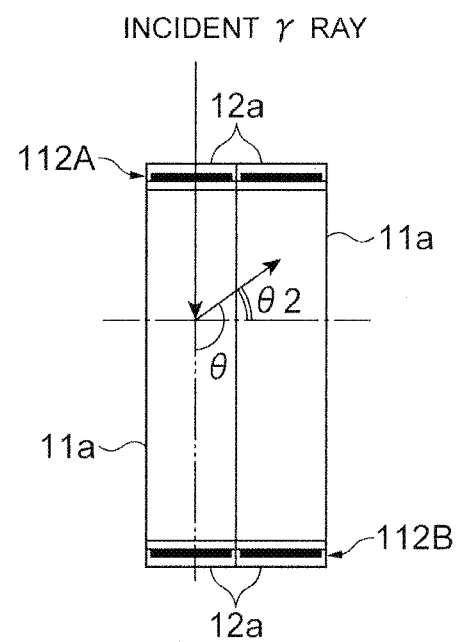
FIG. 10B is a diagram schematically illustrating backward scattering in the Compton scattering.

The angle determination unit 127 obtains an angle between two points of two interaction positions on the basis of two input pieces of DOI position data. FIGS. 10A and 10B schematically illustrate a state in which the radiation incident on the scintillator is subjected to Compton scattering. In FIGS. 10A and 10B, only two scintillators 11a adjacent to each other are drawn. FIGS. 10A and 10B illustrate states in which radiation incident on one scintillator 11a is scattered within an adjacent scintillator 11a due to Compton scattering. As illustrated in FIGS. 10A and 10B, for an angle θ2 between two points of the interaction positions, a direction perpendicular to an extension direction of the scintillator 11a serves as a reference. That is, the angle θ2 between the two points in the case of the forward scattering is an angle obtained by subtracting the Compton scattering angle θ from 90 degrees. Also, the angle θ2 between the two points in the case of the backward scattering is an angle obtained by subtracting 90 degrees from the Compton scattering angle θ.

The position determination unit 124 specifies the position of the scintillator on which the radiation is incident on the basis of a comparison result of the energy comparison unit 23. If one of two pieces of digital data is greater than or equal to the CEE value, the position determination unit 124 determines that radiation is incident on the scintillator of the address of the other digital data. Also, if energy values of both of the two pieces of digital data are greater than or equal to the CEE value, it is determined that separate pieces of radiation are simultaneously incident on two scintillators.

Because a ratio of the backward scattering is high in the range in which the Compton scattering angle is 60 degrees to 180 degrees in the first embodiment, sensitivity is prioritized and it is determined that the scattering is the backward scattering. That is, when energy value data of both of the two input pieces of digital data is less than the CEE value, it is determined that radiation is incident on the scintillator corresponding to a high energy value. In the present embodiment, it is determined whether the scattering is the forward scattering or the backward scattering in the range in which the Compton scattering angle is 60 degrees to 180 degrees to perform position detection with higher precision.

Figure 11:
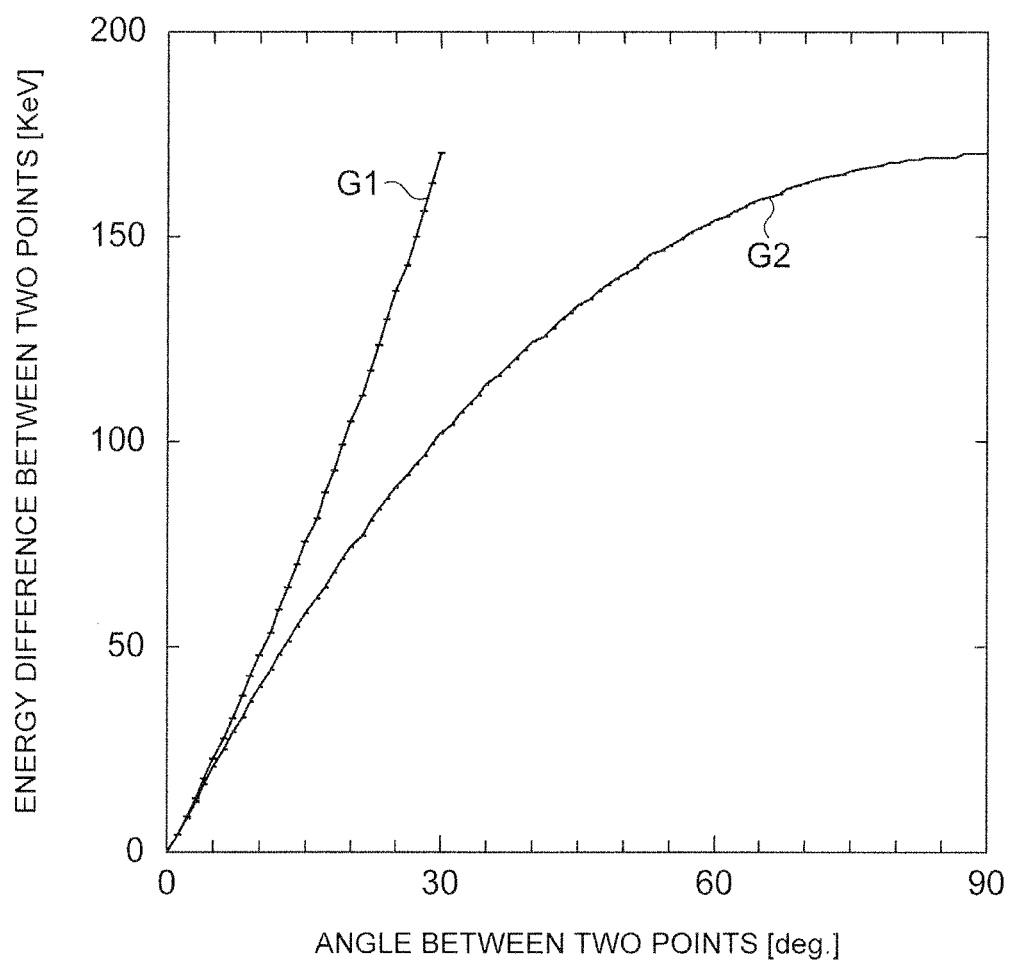
FIG. 11 is a diagram illustrating a relationship between an angle between two points which causes interaction in Compton scattering and an energy difference between the two points.

FIG. 11 is a diagram illustrating a relationship between an angle between two points at which interaction occurs in Compton scattering of γ rays and an energy difference (an absolute value) between the two points. In a plot G1 indicating the forward scattering in FIG. 11, a value obtained by subtracting the recoil electron energy $E_{RE}$ from the scattered γ-ray energy $E_S$ when the Compton scattering angle θ is 60 to 90 degrees is drawn as the energy difference when the angle in-between the two points is 0 to 30 degrees. Also, in a plot G2 indicating the backward scattering, a value obtained by subtracting the scattered γ-ray energy $E_S$ from the recoil electron energy $E_{RE}$ when the Compton scattering angle θ is 90 to 180 degrees is drawn as the energy difference when the angle in-between the two points is 0 to 90 degrees. As is apparent from FIG. 11, it is possible to determine whether the scattering is the forward scattering or the backward scattering on the basis of the angle in-between the two points and the energy difference between the two points when the angle in-between the two points is 0 to 30 degrees (the Compton scattering angle is 60 to 120 degrees).

In the present embodiment, the position determination unit 124 determines that the Compton scattering angle is greater than or equal to 120 degrees when the angle in-between the two points is greater than or equal to 30 degrees if two pieces of energy value data of the two input pieces of digital data are less than the CEE value. In this case, it is determined that the scattering is the backward scattering and the position determination unit 124 determines that radiation is incident at an address at which an energy value is high. Also, when the angle in-between the two points is less than 30 degrees, it is determined whether the scattering is the forward scattering or the backward scattering by comparing the angle in-between the two points and the difference between the energy value data with data of FIG. 11. That is, if the relationship of the angle in-between the two points and the difference between the energy value data is close to the relationship of the plot G1, it is determined that the scattering is the forward scattering. Also, if the relationship of the angle in-between the two points and the difference between the energy value data is close to the relationship of the plot G2, it is determined that the scattering is the backward scattering. If it is determined that the scattering is the forward scattering, it is determined that radiation is incident on the scintillator corresponding to low energy value data. On the other hand, if it is determined that the scattering is the backward scattering, it is determined that radiation is incident on the scintillator corresponding to high energy value data. In the position determination unit 124, position data for which the radiation is determined to be incident between two pieces of position data included in the two pieces of digital data is managed as valid data. Also, the position determination unit 124 has data indicating the relationship of the angle in-between the two points and the difference between the energy value data as, for example, graph data, a database, a calculation formula, or the like.

Figure 12:
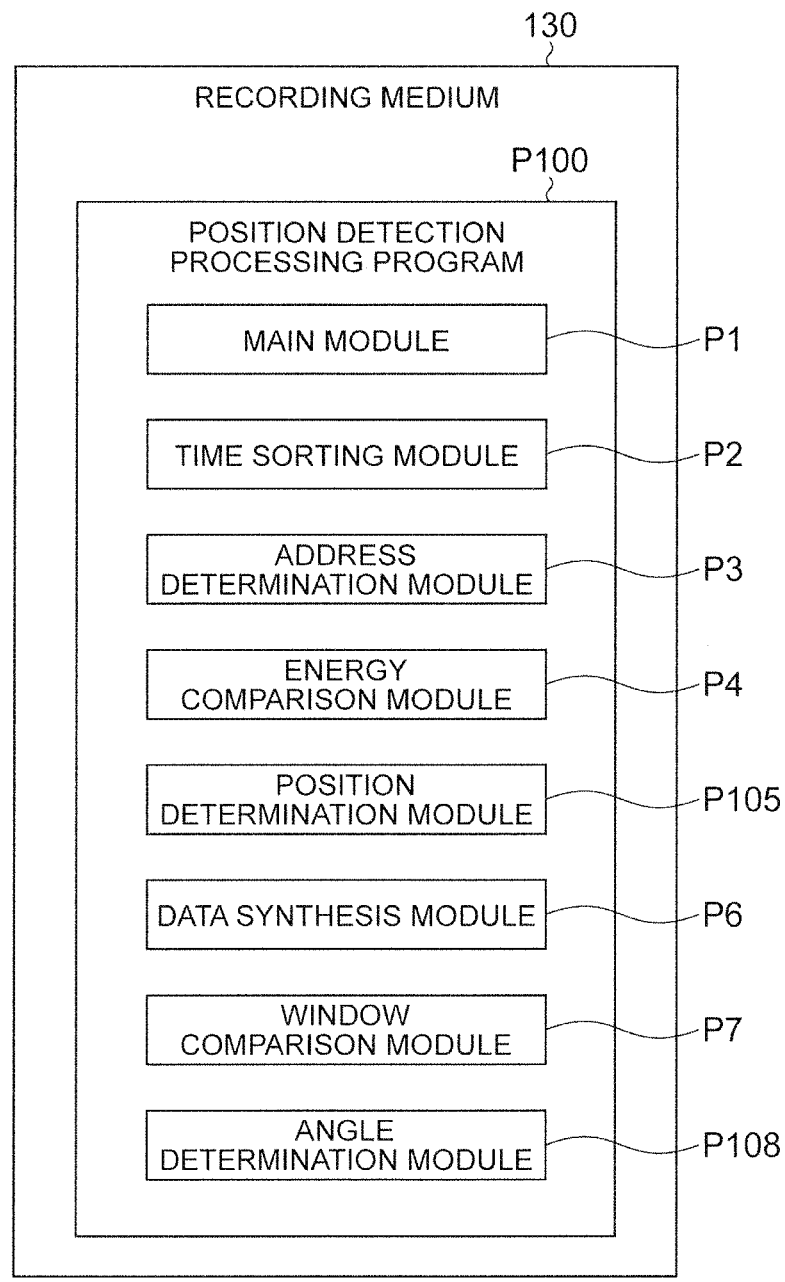
FIG. 12 is a diagram illustrating an embodiment of a recording medium recording a program for causing a computer to function as the position detection processing unit of FIG. 9.

FIG. 12 is a diagram illustrating an embodiment of a recording medium recording a position detection processing program for causing a computer to function as the position detection processing circuit 115. The recording medium 130 is constituted of, for example, a recording medium or a semiconductor memory such as a CD-ROM, a DVD, or a ROM. As illustrated in FIG. 12, a position detection processing program P100 is recorded in a program recording area in the recording medium 130. The position detection processing program P100 includes a main module P1, a time sorting module P2, an address determination module P3, an energy comparison module P4, a position determination module P105, a data synthesis module P6, a window comparison module P7, and an angle determination module P108.

The main module P1 is a part which generally controls the position detection process. Functions implemented by executing the time sorting module P2, the address determination module P3, the energy comparison module P4, the position determination module P105, the data synthesis module P6, the window comparison module P7, and the angle determination module 108 are similar to those of the time sorting unit 21, the address determination unit 22, the energy comparison unit 23, the position determination unit 124, the data synthesis unit 25, the window comparison unit 26, and the angle determination unit 127 described above. Also, the position detection processing program P100 may be provided via a communication network as a computer data signal superimposed on propagation waves.

Next, an example of a position detection process in the radiation position detector 100 will be described.

Figure 13:
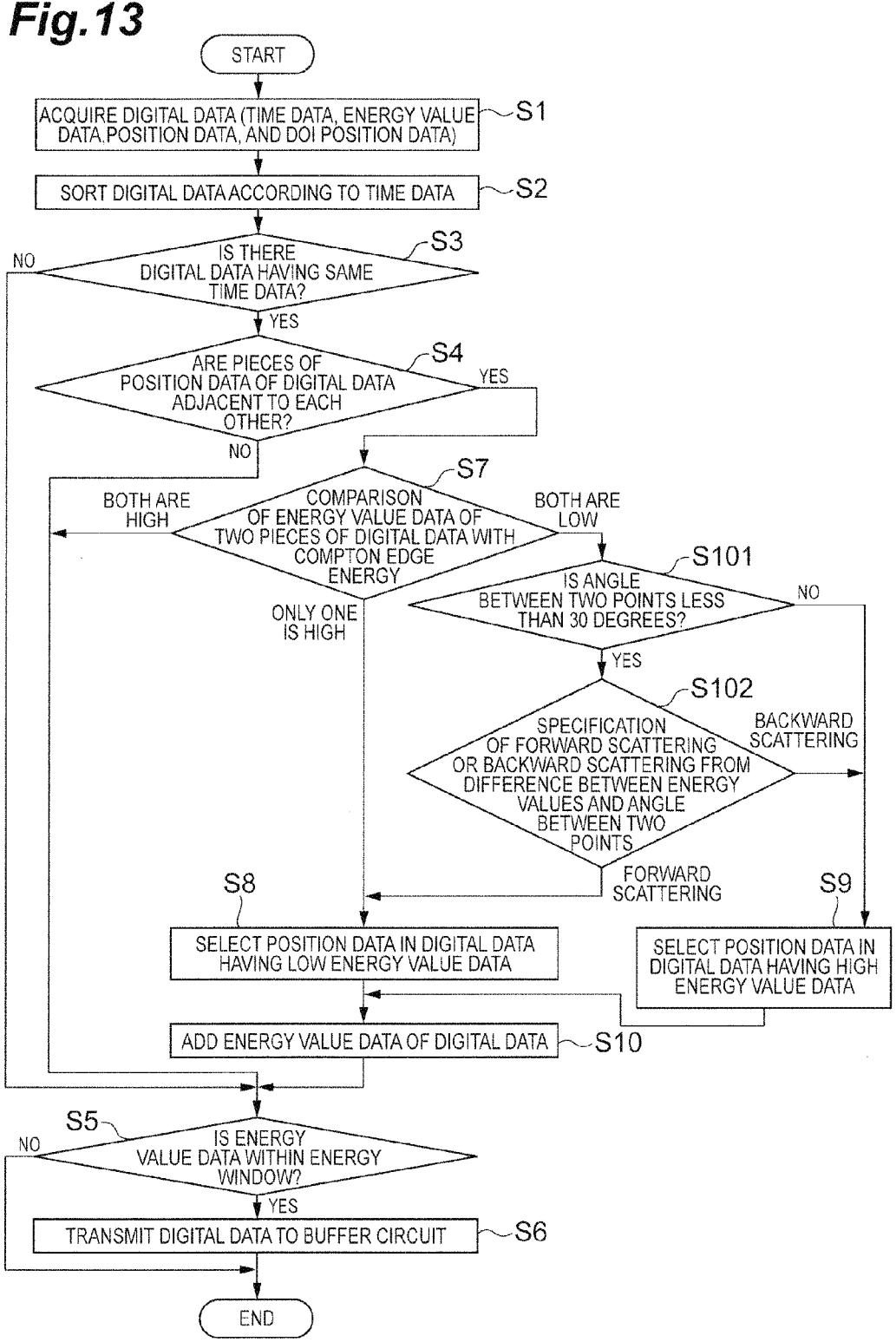
FIG. 13 is a flowchart illustrating a processing flow in the position detection processing unit of FIG. 9.

FIG. 13 is a flowchart illustrating the position detection processing flow in the position detection processing circuit 115. First, the position detection processing circuit 115 acquires digital data input from the energy adding circuit 119 (step S1). The digital data includes time data, energy value data, position data, and DOI position data.

Next, the time sorting unit 21 sorts the digital data acquired by the position detection processing circuit 115 on the basis of the time data and determines whether there are two different pieces of digital data having the same time data (steps S2 and S3).

Next, if the two different pieces of digital data having the same time data are not present, the window comparison unit 26 determines whether the energy value data of the digital data is within the energy window (step S5). If it is determined that the energy value data is within the window, the digital data is treated as valid data. In this case, the digital data is transferred to the buffer circuit 16 (step S6).

On the other hand, if it is determined that the two different pieces of digital data having the same time data are present in step S3, the address determination unit 22 determines whether position data of the two pieces of digital data is in an adjacency relation (step S4). If it is determined as a result of this that two pieces of position data are not adjacent to each other, the window comparison unit 26 determines whether the each energy value data of the two pieces of digital data is within the energy window (step S5). When it is determined that the energy value data is within the window, the digital data is transferred to the buffer circuit 16 (step S6). On the other hand, when it is determined that the energy value data is outside the window, the digital data is saved or discarded as noise data.

If the result of step S4 indicates that the two pieces of position data are determined to be adjacent to each other, a possibility of occurrence of Compton scattering is considered to be high. Therefore, in this case, the energy comparison unit compares values of energy value data in the two pieces of digital data with the CEE value (step S7).

If it is determined that both of the values of the energy value data are greater than the CEE value in step S7, the occurrence of the Compton scattering is absent and separate pieces of radiation are treated as being simultaneously incident on the two scintillators 11a. Therefore, the window comparison unit 26 determines whether the each energy value data of the two pieces of digital data is within the energy window (step S5). If it is determined that the energy value data is within the window, the digital data is transferred to the buffer circuit 16 (step S6).

If it is determined that a value of only one piece of the energy value data is greater than or equal to the CEE value in step S7, the forward scattering is treated as having occurred. In this case, the position data in the digital data having low energy value data is selected as an address of the scintillator 11a on which radiation is first incident (step S8).

When it is determined that two pieces of energy value data are less than the CEE value in step S7, it is determined whether the scattering is the forward scattering or the backward scattering. First, the angle determination unit 127 calculates the angle in-between the two points from DOI position data in the two pieces of digital data. It is determined whether the angle in-between the two points is less than 30 degrees (step S101). If the angle in-between the two points is greater than or equal to 30 degrees in step S101, it is determined that the scattering is the backward scattering. In this case, the position data in the digital data having higher energy value data is selected as an address of the scintillator 11a on which radiation is first incident (step S9).

If it is determined that the angle in-between the two points is less than 30 degrees (if the Compton scattering angle is 60 to 120 degrees) in step S101, it is determined whether the scattering is the forward scattering or the backward scattering from the angle in-between the two points and the difference between the energy value data (step S102). If it is determined that the scattering is the backward scattering, the position data in the digital data having higher energy value data is selected as an address of the scintillator 11a on which radiation is first incident (step S9). On the other hand, if it is determined that the scattering is the backward scattering, the position data in the digital data having low energy value data is selected as an address of the scintillator 11a on which radiation is first incident (step S8).

After steps S8 and S9, the data synthesis unit 25 adds values of energy value data of two pieces of digital data (step S10). The window comparison unit 26 determines whether the added energy value data is within the energy window (step S5). If it is determined that the energy value data is within the window, the digital data is transferred to the buffer circuit 16 (step S6). The digital data transferred to the buffer circuit 16 includes position data selected in step S8 or S9, the energy value data added in step S10, and time data.

In the above-described radiation position detector 100, the pair of optical detector arrays 112A and 112B are provided before and after the scintillator array 11 and a DOI position can be detected. Thereby, it is possible to obtain an angle between two points from DOI positions of interaction positions of radiation in two scintillators. In particular, if the angle in-between the two points is less than 30 degrees, the scattered γ-ray energy $E_S$ and the recoil electron energy $E_{RE}$ are inverted in a boundary of the Compton scattering angle of 90 degrees. Thus, it is difficult to determine the forward scattering and the backward scattering by merely comparing the scattered γ-ray energy $E_S$ and the recoil electron energy $E_{RE}$. In the present embodiment, it is possible to determine whether the Compton scattering is the forward scattering or the backward scattering using an energy value difference between the two scintillators. Thereby, it is possible to detect a position at which radiation is incident with higher precision.

Although embodiments of the present invention have been described above in detail with reference to the drawings, specific configurations are not limited to the embodiments. For example, although an example in which the AD conversion unit is constituted of the TOT circuit, the time-to-digital converter circuit, etc. has been described, the present invention is not limited thereto. The AD conversion unit is not particularly limited as long as an analog signal can be converted into a digital signal.

Also, although an example in which the address determination unit determines whether two pieces of position data are in an adjacency relation in the position detection processing unit has been described, the present invention is not limited thereto. For example, the address determination unit may be configured to perform the comparison of the energy comparison unit when two scintillators are adjacent to each other or further vertically, horizontally, or obliquely separated at a distance of one scintillator from positions adjacent to each other. Also, a configuration may be made without the address determination unit. Even in this case, the energy comparison unit can determine that separate pieces of radiation are simultaneously incident.

Also, although an example in which the time sorting unit sorts digital data has been described, the present invention is not limited thereto. For example, when digital data from the AD conversion unit is input to the position detection processing circuit through parallel processing, two pieces of digital data associated with the Compton scattering are simultaneously input to the position detection circuit. In this case, it is only necessary for the time sorting unit to determine whether the data is simultaneously input data.

[Embodiment Example]

As the embodiment example and the comparative example, the sensitivity and the resolution of each radiation position detector were measured. The embodiment example corresponds to the first embodiment. A radiation position detection device of the embodiment example has a scintillator array having (8×8) scintillators and an optical detector array having (8×8) optical detectors. Both the pitch of the scintillator and the pitch of the optical detector were 1.2 mm. The scintillator array and the optical detector array in the radiation position detection device of the comparative example are similar to those of the embodiment example. Also, in the comparative example, a process of deleting both pieces of digital data is performed when the digital data having the same time data is present. That is, processes of steps S4, S7, S8, S9, and S10 in the first embodiment are not performed in the comparative example.

Figure 14A:
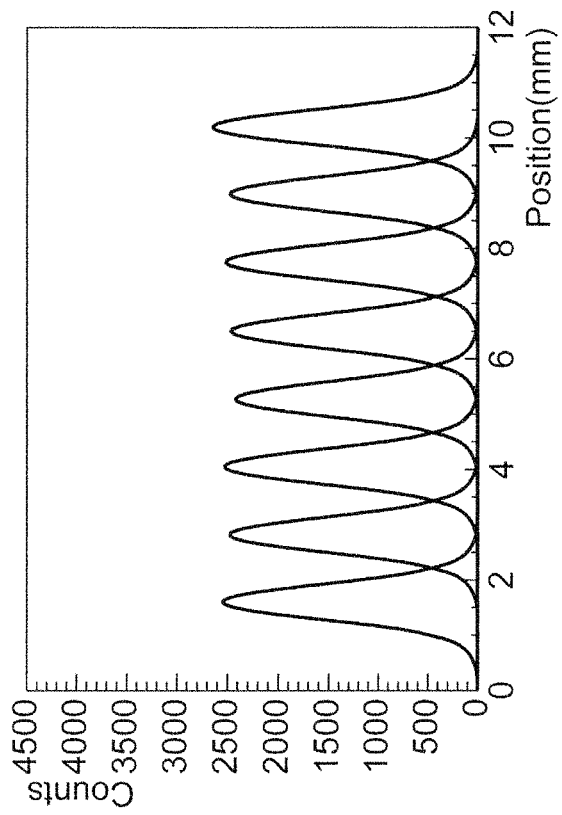
FIG. 14A is a diagram illustrating an experiment result of an embodiment example.
Figure 14B:
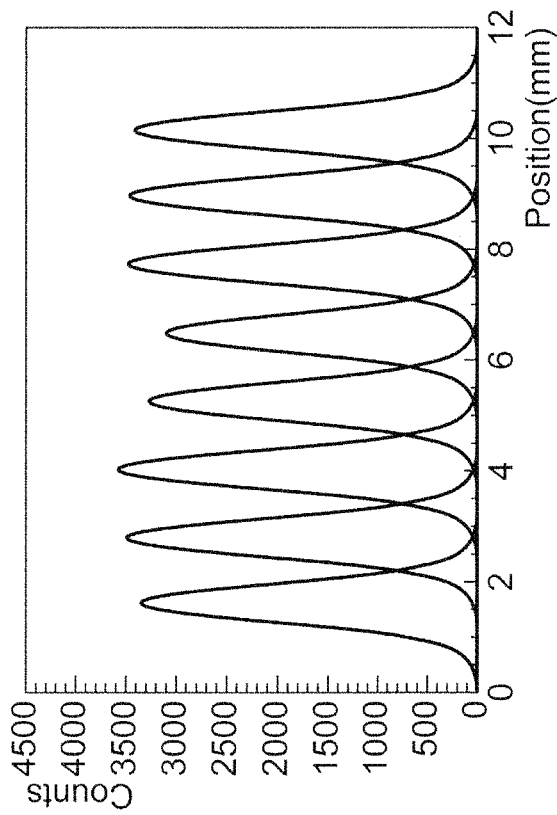
FIG. 14B is a diagram illustrating an experiment result of a comparative example.

FIG. 14A is a measurement result of the embodiment example and FIG. 14B is a measurement result of the comparative example. In the measurement, a $^{22}$Na point source was placed on the center line of the radiation position detectors which were arranged to be opposed and a coincidence response function (CRF) was measured by scanning the point source. The scan was performed in steps of 0.1 mm and a measurement time at a scan point was 120 min. The sensitivity in the measurement, i.e., the sensitivity when a so-called gravity calculation process was performed, was calculated as 100%. Also, an average value of a half-value width of the measurement result and an average value of 1/10 width were set as indices of the resolution. The sensitivity of the embodiment example was 79.9%. Also, the half-value width of the embodiment example was 0.798 mm and the 1/10 width was 1.573 mm. The sensitivity of the comparative example was 55.0%. Also, the half-value width of the comparative example was 0.751 mm and the ⅒ width was 1.439 mm.

In the embodiment example, it was possible to dramatically increase the sensitivity almost without decreasing the resolution as compared with the comparative example. In the above-mentioned measurement, in order to avoid noise due to optical cross-talk or the like, a lower limit of an energy value to be detected was set to 100 keV. Thus, a part of the forward scattering is unused as valid data and therefore a decrease in sensitivity is considered to be caused. The sensitivity is considered to be further increased by suppressing the optical cross-talk and reducing the lower limit of the energy value to be detected. Also, as in the second embodiment, the resolution is considered to be further increased by performing angle detection based on the DOI detection.

What is claimed is:

1. A radiation position detector comprising:
    a scintillator array including a plurality of scintillators on which radiation is incident;
    an optical detector array including a plurality of optical detectors corresponding one-to-one to the scintillators of the scintillator array;
    an AD conversion unit configured to convert an analog signal output from each optical detector of the optical detector array into digital data; and
    a position detection processing unit configured to specify a position of the scintillator on which the radiation is incident on the basis of the digital data obtained through the conversion by the AD conversion unit,
    wherein the digital data has at least time data corresponding to a time at which the radiation is incident, energy value data corresponding to a value of detected energy, and position data corresponding to an address of the scintillator in the scintillator array, and
    wherein the position detection processing unit includes:
    an energy comparison unit configured to compare, if there are two different pieces of digital data having time data indicating the same time, energy value data of the two pieces of digital data with an energy value of a Compton edge; and
    a position determination unit configured to determine that the radiation is incident on the scintillators corresponding to the position data of the two pieces of digital data when both energy values of the two pieces of digital data are greater than the energy value of the Compton edge and specify the address of the scintillator on which the radiation is incident by comparing the energy values of the two pieces of digital data when at least one of the energy values of the two pieces of digital data is less than the energy value of the Compton edge, on the basis of a comparison result of the energy comparison unit.

2. The radiation position detector according to claim 1, wherein the position detection processing unit includes a window comparison unit configured to compare the energy value data of the digital data with a window having a predetermined energy width if there is only one piece of the digital data having the time data indicating the same time and specify the address of the scintillator on which the radiation is incident on the basis of the position data of the digital data when the energy value data is within a range of the window.

3. The radiation position detector according to claim 1, wherein the plurality of scintillators are arranged in a matrix shape in the scintillator array, and
    wherein the energy comparison unit performs comparison when the scintillators corresponding to the two pieces of digital data are vertically, horizontally, or obliquely adjacent to each other or further vertically, horizontally, or obliquely separated at a distance of one scintillator from positions adjacent to each other.

4. The radiation position detector according to claim 1,
    wherein the plurality of scintillators are arranged in a matrix shape in the scintillator array, and
    wherein the energy comparison unit performs comparison when the scintillators corresponding to the two pieces of digital data are vertically, horizontally, or obliquely adjacent to each other.

5. The radiation position detector according to any one of claim 1,
    wherein, when only one of the two pieces of digital data has the energy value data greater than or equal to the energy value of the Compton edge, the position determination unit determines that the radiation is incident on the scintillator corresponding to the position data of the other digital data, and
    wherein, when both of the two pieces of digital data have the energy value data less than the energy value of the Compton edge, the position determination unit determines that the radiation is incident on the scintillator corresponding to the position data of the digital data having a high energy value.

6. The radiation position detector according to any one of claim 1,
    wherein a pair of optical detector arrays are provided in front of and behind the scintillator array,
    wherein the position detection processing unit further includes an angle determination unit configured to obtain depths of interaction positions of the radiation in the two scintillators by DOI detection and obtain an angle in-between two points of the interaction positions with respect to a direction perpendicular to an extending direction of the scintillator,
    wherein, when only one of the two pieces of digital data has the energy value data greater than or equal to the energy value of the Compton edge, the position determination unit determines that the radiation is incident on the scintillator of the address of the other digital data, and
    wherein, when both of the two pieces of digital data have the energy value data less than the energy value of the Compton edge, the position determination unit determines the scintillator corresponding to a piece of the digital data for which the radiation is incident on the basis of a difference between the two pieces of energy value data and the angle in-between the two points.

7. The radiation position detector according to claim 6,
    wherein the position determination unit determines that the radiation is incident on the scintillator corresponding to the position data of the digital data having high energy value data when the angle in-between the two points obtained by the angle determination unit is greater than 30 degrees if both of the energy values of the two pieces of digital data are less than energy of the Compton edge, and
    wherein the position determination unit determines that the radiation is incident on the scintillator corresponding to one piece of the digital data on the basis of a difference between energy value data in the two scintillators and the angle in-between the two points when the angle in-between the two points obtained by the angle determination unit is less than the 30 degrees.

8. A PET device including the radiation position detector according to any one of claim 1.

9. A non-transitory computer-readable recording medium recording a program for causing a computer to execute a process of specifying a position of a scintillator on which radiation is incident on the basis of digital data obtained through conversion by an AD conversion unit and having at least time data corresponding to a time at which the radiation is incident, energy value data corresponding to a value of detected energy, and position data corresponding to an address of the scintillator in a scintillator array in a radiation position detector including the scintillator array including a plurality of scintillators on which the radiation is incident, an optical detector array including a plurality of optical detectors corresponding one-to-one to the scintillators of the scintillator array, and the AD conversion unit configured to convert an analog signal output from each optical detector of the optical detector array into the digital data, the process comprising; an energy comparison step of comparing, if there are two
- different pieces of digital data having time data indicating the same time, energy value data of the two pieces of digital data with an energy value of a Compton edge; and
- a position determination step of specifying the position of the scintillator on which the radiation is incident from the position data of the digital data on the basis of a comparison result of the energy comparison step.

* * * * *